United States Patent [19]

Togashi et al.

[11] Patent Number: 4,642,620

[45] Date of Patent: Feb. 10, 1987

[54] MATRIX DISPLAY DEVICE

[75] Inventors: Seigo Togashi; Kanetaka Sekiguchi, both of Tokorozawa, Japan

[73] Assignee: Citizen Watch Company Limited, Tokyo, Japan

[21] Appl. No.: 536,105

[22] Filed: Sep. 26, 1983

[30] Foreign Application Priority Data

Sep. 27, 1982 [JP] Japan .................................. 57-167944
Sep. 27, 1982 [JP] Japan .................................. 57-167945

[51] Int. Cl.[4] .............................................. G09G 3/02
[52] U.S. Cl. ....................................... 340/713; 340/719
[58] Field of Search ............... 340/713, 714, 784, 718, 340/719, 783, 811, 781, 752; 357/10, 13, 15, 38, 45, 48, 51

[56] References Cited

U.S. PATENT DOCUMENTS

| | | | |
|---|---|---|---|
| 3,654,606 | 4/1972 | Marlowe et al. | 340/784 X |
| 3,840,873 | 10/1974 | Usui | 340/752 X |
| 4,070,663 | 1/1978 | Kanatani et al. | 340/784 |
| 4,198,630 | 4/1980 | Sczinker et al. | 340/784 |
| 4,223,308 | 9/1980 | Baraft et al. | 340/784 X |
| 4,233,603 | 11/1980 | Castleberry | 340/784 X |
| 4,239,346 | 12/1980 | Lloyd | 340/784 X |
| 4,251,136 | 2/1981 | Miner et al. | 340/719 X |
| 4,288,805 | 9/1981 | Depey | 357/48 X |
| 4,373,166 | 2/1983 | Bergeron et al. | 357/13 X |
| 4,403,217 | 9/1983 | Becker et al. | 340/784 X |
| 4,495,375 | 1/1985 | Rickus et al. | 357/15 X |
| 4,535,327 | 8/1985 | Hareng et al. | 340/719 |
| 4,543,573 | 9/1985 | Fuyama et al. | 340/781 |
| 4,554,485 | 11/1985 | Yamada | 340/719 X |

Primary Examiner—Gerald L. Brigance
Assistant Examiner—Vincent P. Kovalick
Attorney, Agent, or Firm—Jordan and Hamburg

[57] ABSTRACT

In a matrix display device, non-linear resistance elements are coupled to each display element for controlling selective activation of display elements in response to drive signals, with each non-linear resistance element comprising sets of rectifying elements formed by thin film deposition which are connected in parallel with one another with opposing polarities. Each set comprise one or more rectifying elements formed of for example PN junctions, PIN junctions, Schottky junctions, etc., using material such as amorphous silicon as a semiconductor material, and the rectifying elements can be disposed in a multilayer configuration in order to reduce the display area occupied, or can be provided with transparent electrodes to positively utilized incident light to enhance current flow.

22 Claims, 44 Drawing Figures

Fig. 32
(A) 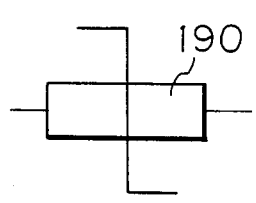
(B) 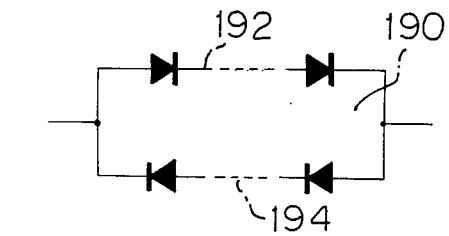
Fig. 33
(A) 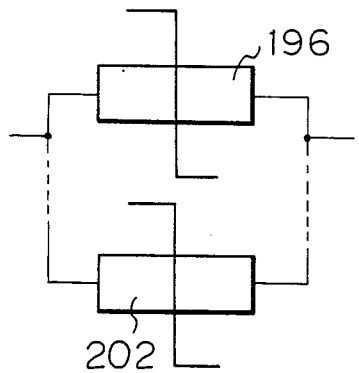
(B) 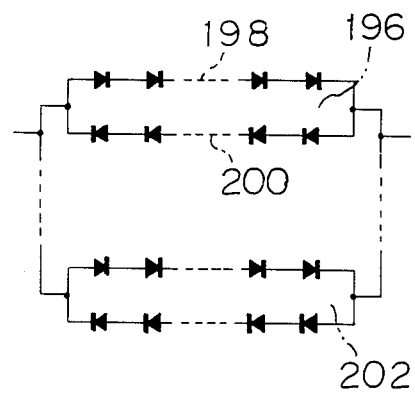
Fig. 34
(A) 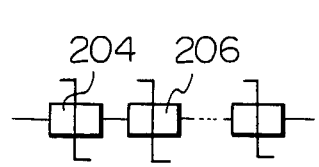
(B) 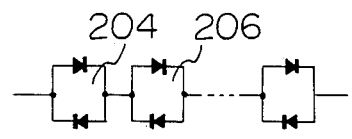

MATRIX DISPLAY DEVICE

BACKGROUND OF THE INVENTION

Planar display devices of various types, employing display elements such as liquid crystal elements etc, have now reached the stage of practical application, and the main requirement at present is to implement high density models of such display devices. Problems which arise with regard to the drive characteristics of such display devices can be overcome by incorporating control elements to control the application of drive signal potentials to the display elements. These control elements can be active elements such as transistors, or active elements such as diodes or varistors, with one or more of the control elements being coupled to each display element. Such a method has been discussed for example by B. J. Lechner et al in a report published in the Proceedings of the IEEE, volume 59, No. 11, pages 1566 to 1579 (designated hereinafter as reference document (1). This describes both the use of 3-terminal elements (i.e. transistors) and two-terminal elements (i.e. non-linear resistance elements) as control elements. There have been proposals to use ceramic varistor to form such non-linear resistance elements, in a report by D. E. Castleberry in the IEEE ED-26, 1979, pages 1123 to 1128. (reference document (2). In addition, it has been proposed to use MIM type diodes for such non-linear resistance elements, for example as described by D. R. Baraff et al, in the IEEE ED-28, 1981, pages 736 to 739. (reference document 3). However, several problems have arisen with these prior art methods, which have prevented them from reaching the stage of practical application. These basically are as follows:

1. Lack of uniformity of element characteristics.
2. Large amount of stray deviations in the threshold voltage of the elements.
3. A sufficiently high level of ON current $I_{on}$ cannot be produced.
4. The level of OFF current $I_{off}$ is excessively high
5. The drive power level required is high.
6. The characteristics are not symmetrical with respect to positive and negative voltages
7. Crosstalk is high.

In the above, the ON current Ion is the level of current which must be supplied by a non-linear resistance element to a display element in response to a specific drive signal potential in order to set that display element in the activated state or non-activated state in a selected period (generally speaking, a light state or otherwise visible state), or maintain a display element in the activated state. The OFF selected Ioff is the leakage current which will flow through the non-linear resistance element from a display element in response to the absence of a drive signal potential intended to hold that display element in the non-activated state (generally speaking, a dark or otherwise non-visible state). The higher the value of Ion attainable, the higher will be the maximum frequency with which display elements can be switched between the activated and non-activated states, since this current determines the amount of charge which can be transferred to or from a display element within a specific drive time interval.

In general, such non-linear resistance elements must have a symmetrical bidirectional conductance, e.g. of the general form of that of a varistor, in order to enable display elements such as liquid crystal display elements to be driven, which require application of alternating drive signal potentials. In the following, the term "non-linear resistance element" will be applied to a device having such a conductance characteristic. The term "rectifier element" will be applied to a device having a unidirectional, i.e. a diode type of conductance characteristic.

SUMMARY OF THE INVENTION

The present invention describes various means whereby the problems described above which arise with prior art methods of utilizing non-linear resistance elements in a matrix display device can be effectively overcome, enabling the practical manufacture of matrix display devices utilizing non-linear resistance elements as control elements which will provide excellent display quality and are suitable for analog display applications, e.g. TV displays. This achieved by forming each non-linear resistance element as two sets of rectifying elements connected in parallel, with the rectifying elements in each set having mutually opposite polarities, and with the rectifying elements being formed by thin film deposition techniques e.g. as PN or PIN junction elements utilizing a material such as amorphous silicon as a semiconductor. If the value of threshold voltage provided by a single rectifying element is insufficient, then each set of rectifying elements in a non-linear resistance element can be formed of a plurality of rectifying elements which are successively stacked in a vertically overlapping manner on a substrate such as to be effectively connected in series, thereby substantially reducing the amount of display area which is occupied by each set and so increasing the effective "aperture ratio" (i.e. the ratio of the area of a picture element which is actually effective to the area which is blocked off by control elements, connecting leads etc.) of each picture element of the display. With such an arrangement, the area of display substrate occupied by each of the two sets of rectifying elements of a non-linear resistance element can be made equal, so that photo-electric currents which are generated by each set of rectifying elements in response to incident light or heat will mutually cancel, and therefore will not increase the level of Ioff of the non-linear resistance element. Alternatively, the disclosure describes the use of transparent electrodes for connecting to the rectifying elements, such that incident light is positively utilized to increase the available level of Ion of the non-linear resistance elements.

In addition to the use of PN and PIN junctions, the disclosure describes the use of other types of rectifying junctions including Schottky junctions, to be used to form the rectifying elements of the non-linear resistance elements of a matrix display device.

BRIEF DESCRIPTION OF THE DRAWINGS

FIGS. 32, 33 and 34 are equivalent circuit diagrams of non-linear resistance elements each formed of sets of rectifying elements disposed with mutually opposing polarities, with each set comprising a plurality of rectifying elements;

DESCRIPTION OF THE PREFERRED EMBDODIMENTS

Figure 1:
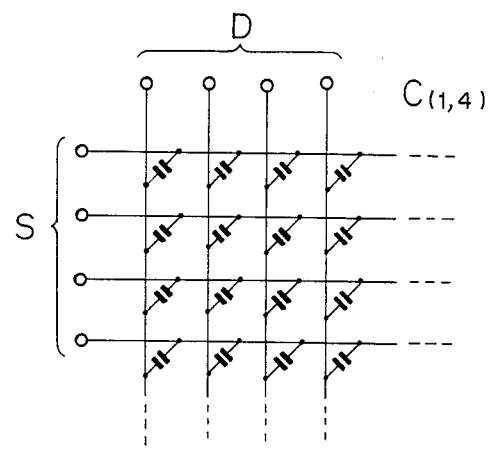
FIG. 1 is a diagram for describing the basic operation of a matrix display.
Figure 2:
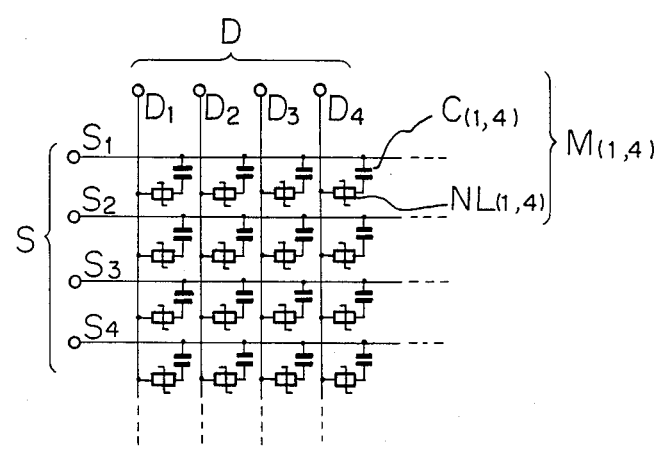
FIG. 2 is a diagram for describing the operation of a matrix display device incorporating non-linear resistance elements.

Before describing embodiments of the present invention, a simple explanation will be given of the basic configuration of a matrix display. FIG. 1 is a diagram for describing a type of matrix display, sometimes referred to as a passive matrix display, which does not incorporate control elements. In FIG. 1, S denotes a plurality of row electrodes, D denotes a plurality of row electrodes, with display elements C disposed at the intersections of the row electrodes and column electrodes. FIG. 2 is a diagram for describing a matrix display device in which 2-terminal control elements, i.e. non-linear resistance elements NL, are used. Each matrix element M disposed at an intersection of a row electrode and column electrode comprises a non-linear element NL and a display element C connected in series.

Figure 3:
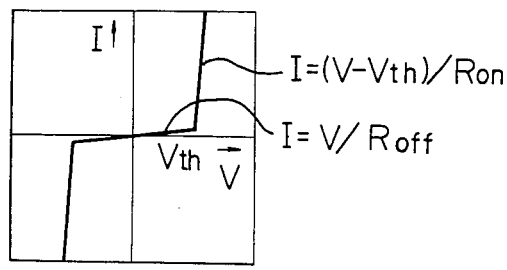
FIG. 3 is a graph showing the I-V characteristic of an ideal non-linear resistance element.

FIG. 3 shows the ideal characteristics of a non-linear element. As shown, two different resistance values, $R_{off}$ and $R_{on}$ are displayed for voltages developed across the element whose absolute values are below and above the threshold voltage $V_{th}$, respectively.

Figure 4:
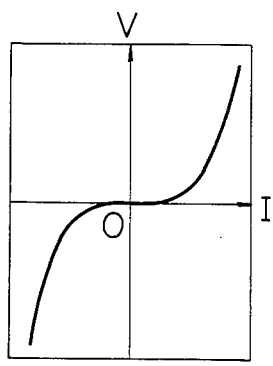
FIG. 4 is a graph showing the I-V characteristic of an non-linear resistance element comprising elements such as varistors or MIM diodes.

FIG. 4 shows the characteristics of a prior art type of non-linear resistance element formed of varistors or MIM diodes as described in reference document 3. MIM elements exhibit a characteristic of the form:

$$I \propto V \exp(B\sqrt{V}),$$

while varistors exhibit a characteristic of the form:

$$I \propto V^r, \text{ where } r \geq 50$$

In each case, the non-linearity is poorly defined, by comparison with the ideal example shown in FIG. 3. As a result, there is a large value of $I_{off}$ close to the threshold voltage $V_{th}$, making it difficult to precisely switch drive currents to the display elements in response to predetermined drive signal potentials. In addition, the operation is influenced by data signals of other rows, i.e. crosstalk is produced. Thus, it is not possible to use such non-linear resistance elements to implement an analog display which requires very precise control of picture element contrast levels, for example a TV display.

Figure 5:
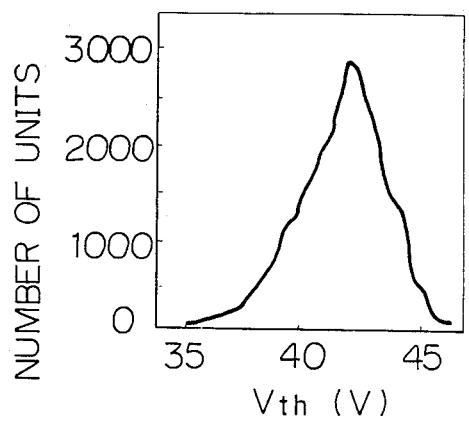
FIG. 5 is a graph showing the distribution of threshold voltage deviation, for varistors.

FIG. 5 shows the distribution of stray deviations in the value of threshold voltage $V_{th}$ of varistors, as described in reference document 2. As shown, it is difficult to control the value of $V_{th}$ for varistors, due to the wide range of stray manufacturing deviations. This is also true of MIM elements whose operation is based upon tunnelling currents passing through a thin layer of electrically insulating material. The insulation quality of such a layer is strongly affected by the nature of the material constituting the layer, making it difficult to control $V_{th}$, $I_{on}$ and $I_{off}$ to precise predetermined values.

Rather than using varistors or MIM elements, it is possible to use the forward conductance characteristics of diodes to implement non-linear resistance elements, since these provide non-linear elements which have closely controlled characteristics and a high level of threshold voltage. Reference document 1 proposes such an arrangement, in which diodes are connected in a ring configuration. That is, each non-linear resistance element comprises two sets of up to 40 diodes each, the diodes in each set being connected in series, the sets being connected in parallel with mutually opposite polarities. However, problems arise with the use of such diode rings. Firstly, if a total of $40 \times 2 = 80$ elements are used for each matrix element, then in the case of a matrix which has 500 rows and 500 columns, a total of $2 \times 10^7$ elements will be required. It is impossible to separately dispose such a large number of elements on a display panel using normal manufacturing methods, although the present invention discloses an arrangement whereby the display substrate area occupied by a number of rectifier elements connected in series can be very greatly reduced, by comparison with prior art methods in which the rectifier elements are separately disposed on a substrate and interconnected by leads formed thereon. In addition, using normal manufacturing methods, it is difficult to hold the leakage currents of the diode junctions to a low and stable value, when such a large number of elements are used. Furthermore, if a large number of series-connected elements are used in the configuration of each non-linear resistance element, it is difficult to attain a sufficiently high value of $I_{on}$, and a high level of power supply voltage will be required due to the high value of threshold voltage $V_{th}$.

With the present invention, the above disadvantages of the prior art are greatly reduced. The present invention will now be described, referring to the drawings.

Figure 6:
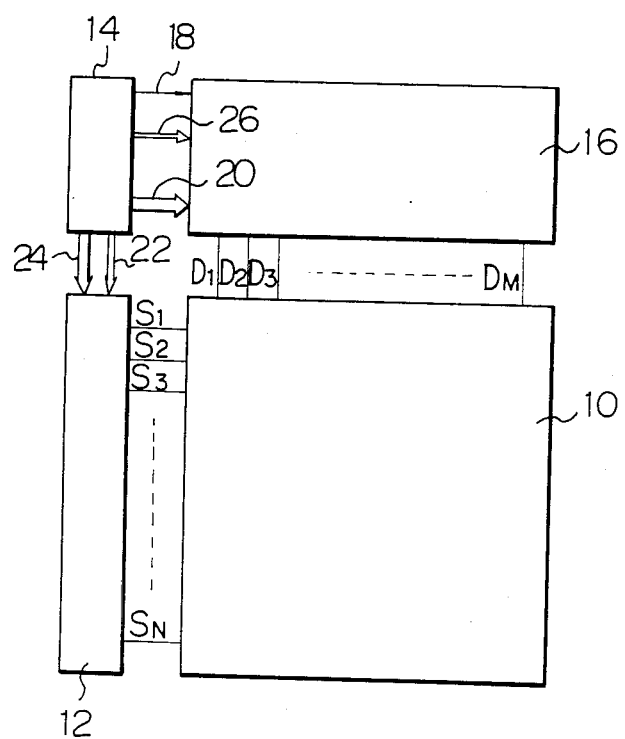
FIG. 6 is a block circuit diagram of an embodiment of a matrix display device according to the present invention.

FIG. 6 is a block diagram of an embodiment of a display device according to the present invention. Numeral 10 denotes a display panel. Numeral 12 denotes a row electrode driver circuit for applying scanning signals having the form $\phi^*$ shown in FIG. 7, to the row electrodes S1 to SN of the display panel. Numeral 16 denotes a column electrode driver circuit for applying data signals having the form Dm shown in FIG. 7 to the column electrodes D1 to DM. Numeral 14 denotes a controller for supplying display data 18, timing signals 24 and 26, and power supplies 20 and 22 to the driver circuits.

Figure 7:
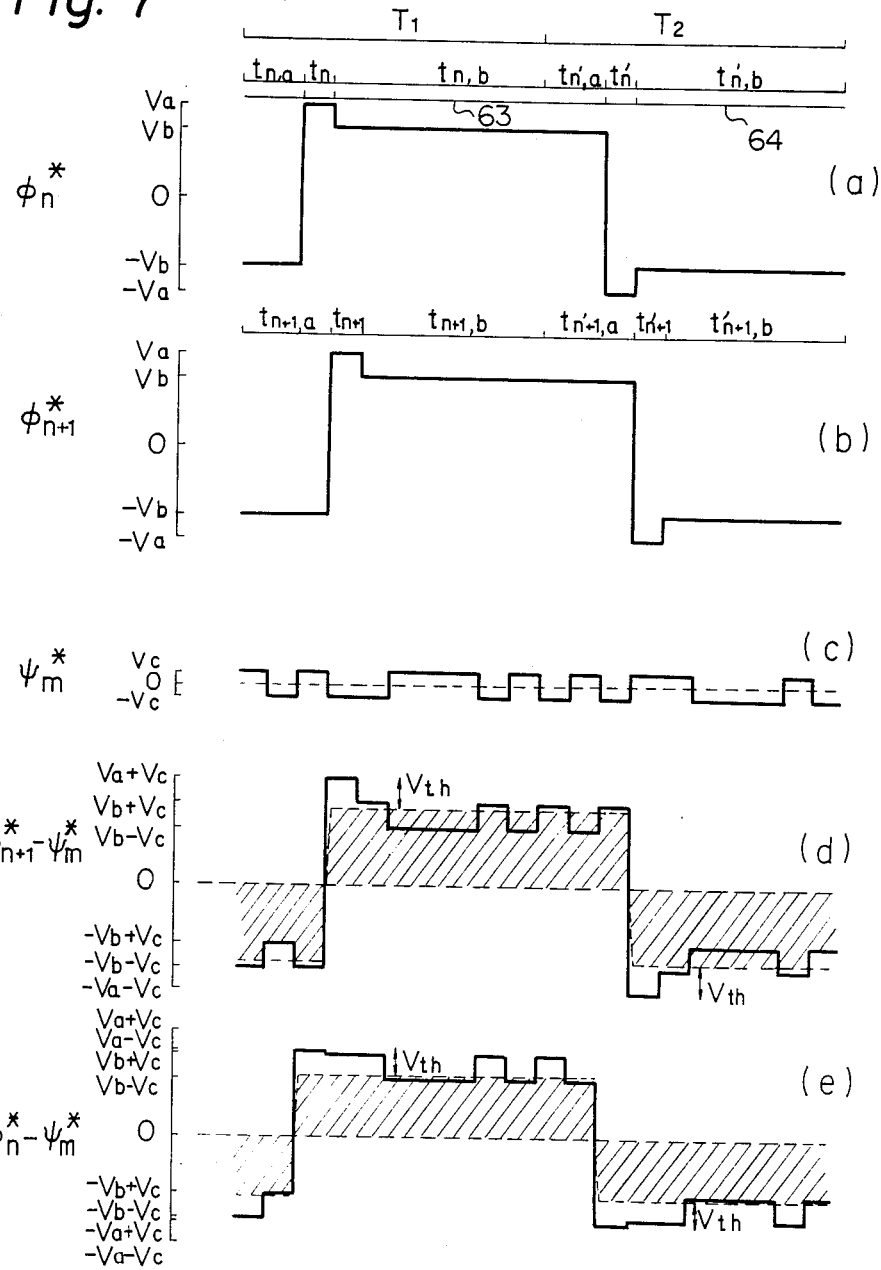
FIG. 7 and FIG. 8 are waveform diagrams illustrating suitable drive signal waveforms for operation of a matrix display device incorporating non-linear resistance elements having a low value of threshold voltage.

FIG. 7 shows an example of drive signal waveforms. Using drive signals having such waveforms, a value of threshold voltage Vth for the non-linear elements of the order of 0.5 to 1 V will be sufficient. Thus, it is possible to use a single diode stage for each non-linear element, rather than up to 40 stages as is required in the prior art example described above.

Figure 8:
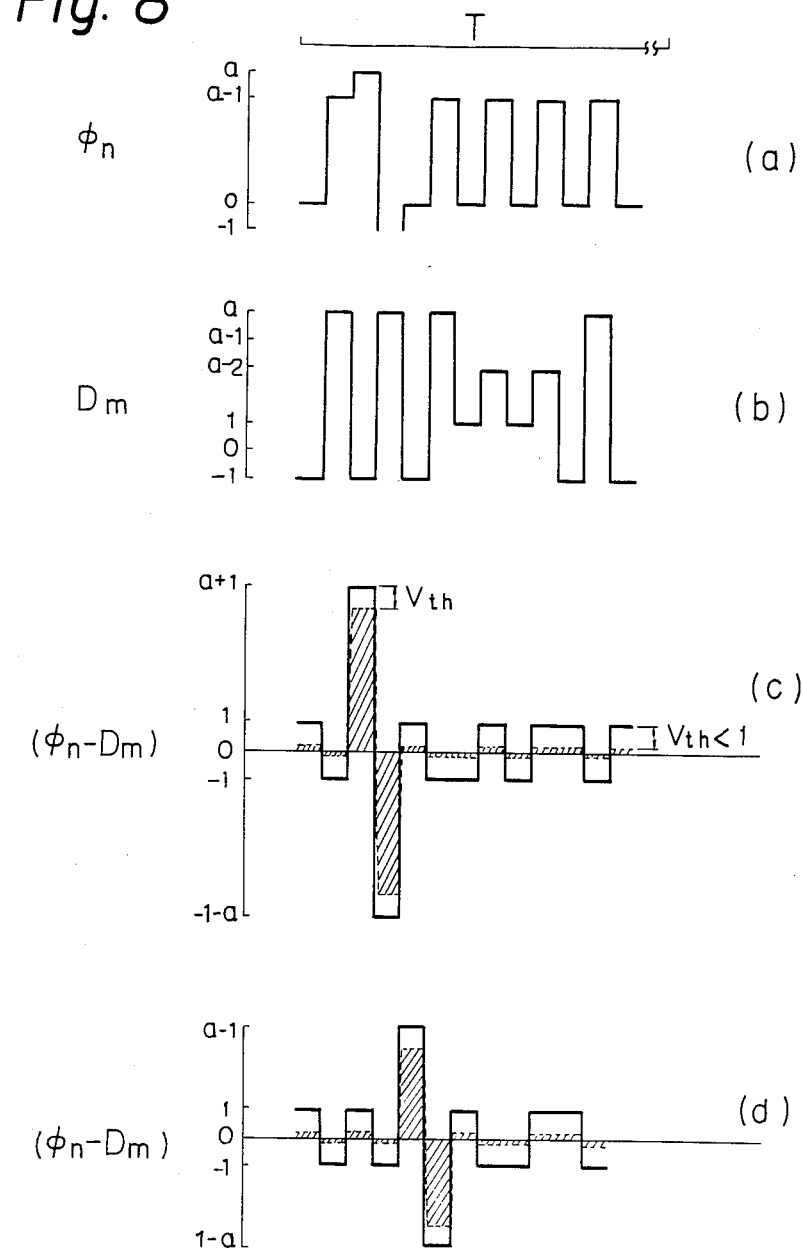

FIG. 8 shows another example of drive signal waveforms. In the following, the voltage that must be applied to a display element to set it in the activated state will be designated as $V_{on}$, the voltage which must be applied to hold a display element in the non-activated state being designated as $V_{off}$, and the ratio $V_{on}/V_{off}$ being designated the operating margin M. The operating margin M is a measure of the picture quality that is provided by a display, resulting from the degree of resolution and contrast (i.e. contrast ratio) provided by the display.

Using drive signal waveforms of the form shown in FIG. 7 or 8, a value of threshold voltage Vth for the non-linear resistance elements in the range 0.5 to 1 V will provide a sufficiently high value of operating margin M, so that if each non-linear element is formed of two sets of diodes connected in parallel with opposing polarities, then each set can comprise from 1 to 3 diode stages.

Figure 9:
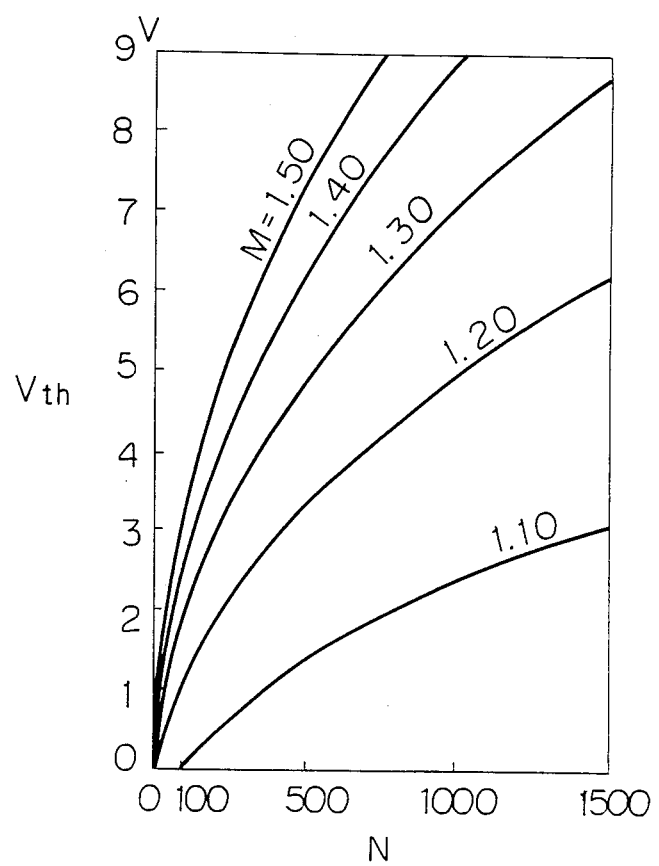
FIG. 9 is a graph illustrating the relationship between the Vth of non-linear resistance elements, the operating margin M and the resolution factor N for display elements of a matrix display device.

FIG. 9 shows the relationship between the operating margin M, the threshold voltage $V_{th}$ of the non-linear elements, and the display resolution factor N, for the case of display elements which have an activation voltage of 2 V. The greater the value of M, the better will be the picture quality. Also, as can be seen from FIG. 9, for a specific degree of resolution, the higher the value of threshold voltage $V_{th}$ of the non-linear elements, the better will be the picture quality. In addition, for a particular value of margin M, the higher the value of threshold voltage $V_{th}$ of the non-linear elements, the better will be the display resolution factor N, with this factor increasing rapidly as the value of $V_{th}$ is increased. In addition, if the speed of response of the display device is to be made high, then the level of ON current $I_{on}$ will also have to be made high, in order to ensure that the amount of current which flows through the display elements during a predetermined drive time interval will be sufficient. If the value of $I_{on}$ is not sufficient, then the ON and OFF states of the display elements will be poorly defined, and the contrast gradient will be low, making the picture quality poor. It can thus be understood that the values of $V_{th}$ and of $I_{on}$ are very important in a display device. From the aspects of control of element characteristics and cost, non-linear elements which utilize the forward conductance characteristic of diodes can be considered preferable.

Figure 10:
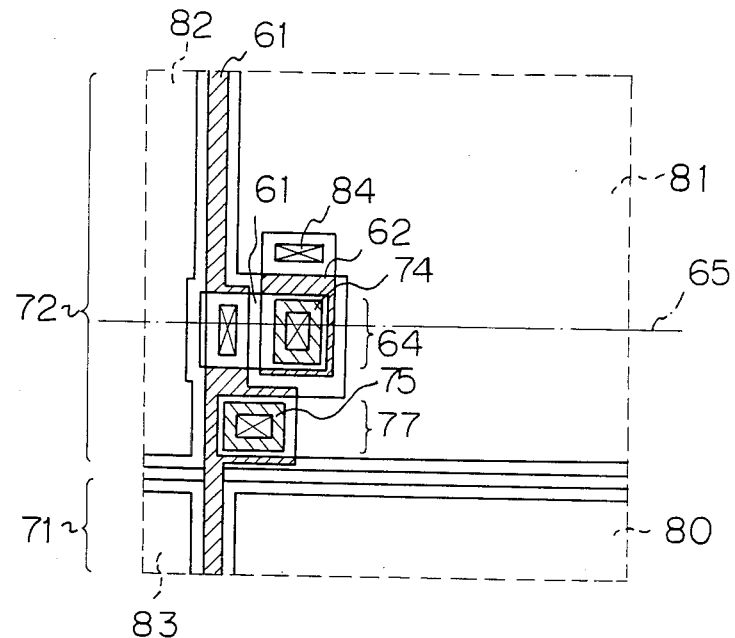
FIGS. 10 and 11 are a plan view and cross-sectional view respectively of a portion of a display panel according to an embodiment of the present invention, in which thin-film PIN diodes are utilized to form non-linear resistance elements.
Figure 11:
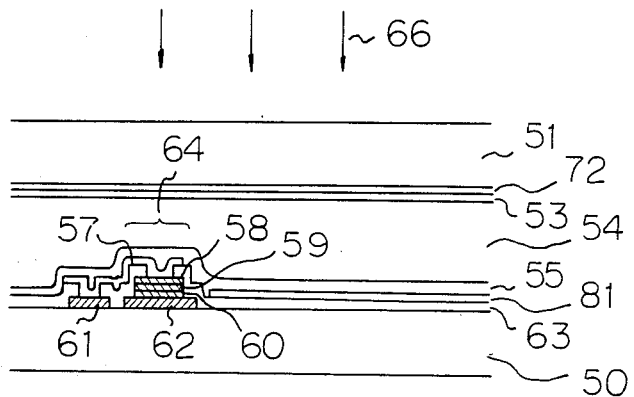
Figure 12:
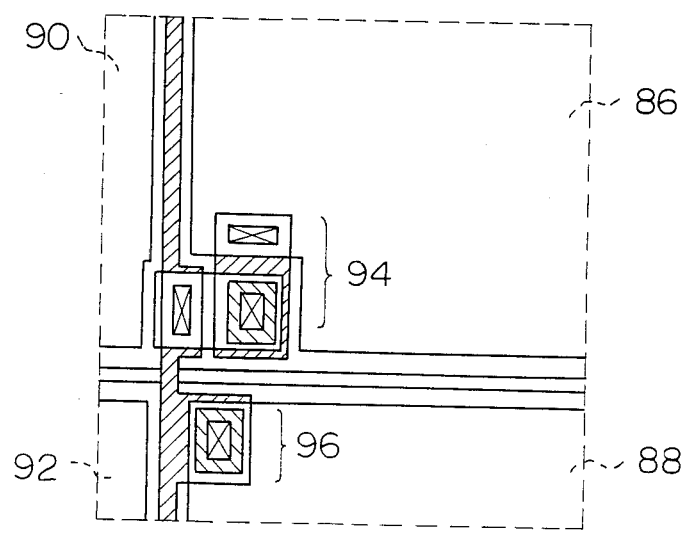
FIG. 12 is a plan view of a modified form of the display panel of FIGS. 10 and 11.

FIG. 10 is a plan view of a portion of an embodiment of a display panel according to the present invention. FIG. 11 is a cross-sectional view taken through line 65 in FIG. 10. In this embodiment, each non-linear resistance element comprises a pair of rectifier elements connected in parallel with opposing polarities, each rectifier element comprising a PIN diode formed by thin film deposition. This embodiment would be suitable for a matrix display device employing drive signals of the type illustrated in FIG. 7 or FIG. 8 above, whereby only a low value of threshold voltage is required for the non-linear resistance elements. Numerals 50, 51 denote substrates, numerals 72 and 71 denote row electrodes, numerals 53, 55 denote a surface protection film and an alignment layer respectively, and numeral 54 denotes a display element comprising a material such as liquid crystal. Numerals 64 and 77 denote rectifier elements, which comprise semiconductor portions 74, 75 each made up of a P-type semiconductor layer 60, an I-type semiconductor layer 59 having a low level of added impurities, and an N-type semiconductor layer 58, to form a PIN diode structure. Numeral 81 denotes a display electrode and numeral 61 a column electrode. The column electrode 61 is coupled to one terminal of rectifier element 64 through a conducting layer 57. The opposite polarity terminal of rectifier element 64 is connected to display electrode 81 of display element 54 by a connecting electrode 62 coupled through a contact aperture 84. FIG. 12 shows a plan view of a slightly different embodiment in which, as opposed to the arrangement of FIG. 10, two groups of rectifier elements, 94 and 96 are formed in a corner of each picture element.

As will be clear from the above embodiments, one feature of the present invention is the use of rectifier elements which are formed as thin films. Another feature is that the current paths of these rectifier elements are disposed directly upon the substrate. Such an arrangement allows the crosssectional area of the current path to be maximized, so that a disadvantageof prior art elements of this type, namely an insufficient value of $I_{on}$, can be overcome. It is further possible to reduce this problem of insufficient $I_{on}$ by supplementation through the action of light.

Figure 13:
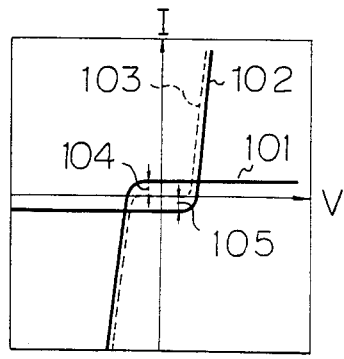
FIG. 13 is a graph illustrating how photoelectric currents generated in a non-linear resistance element having a symmetrical configuration as in FIGS. 10 and 11 are effectively cancelled.
Figure 14:
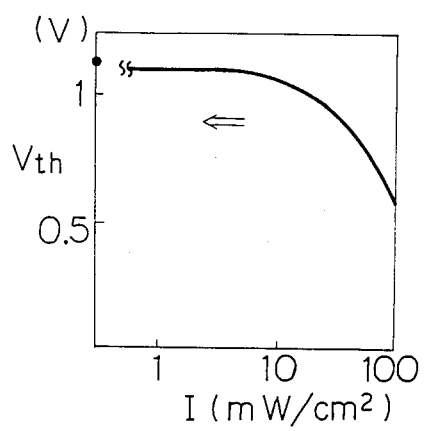
FIG. 14 is a graph illustrating the relationship between threshold voltage and incident light for a non-linear resistance element having the configuration of FIGS. 10 and 11.

In general, one of the disadvantages of utilizing transistors or diodes as control elements in matrix displays is that of sensitivity to light. Since diodes are a type of solar cell, erroneous operation can result due to photoelectric currents being generated. With the present invention, two groups of rectifier elements are symmetrically disposed in relation to externally produced incident light and heat in such a manner that the effects of these substantially mutually cancel. For example, rectifier elements 64 and 77, or 94 and 96 in FIGS. 10 and 12 are formed with substantially the same shape and are positioned in close proximity to one another, so that the areas of the semiconductor portions of each of these rectifier elements with respect to external light incident thereon, (e.g. as indicated by numeral 66 in FIG. 11) are almost identical. For example, if each non-linear resistance element is made up of amorphous silicon PIN diodes formed by the plasma CVD method, then curves 101 and 102 in FIG. 13 show the solar cell characteristics of each of the diodes. Since these are connected in parallel with opposing polarities, the overall characteristic obtained for the non-linear resistance element is as indicated by numeral 103. As can be seen, the photoelectric current 104 and 105 mutually cancel each other within the non-linear resistance element, and do not appear external to it. In addition, as illustrated in FIG. 14, the threshold voltage $V_{th}$ is substantially stable with respect to changes in incident light levels, up to a light level of the order of 1/10 of the AM1 (i.e. air mass 1) solar cell sensitivity value (100 mW).

Figure 15:
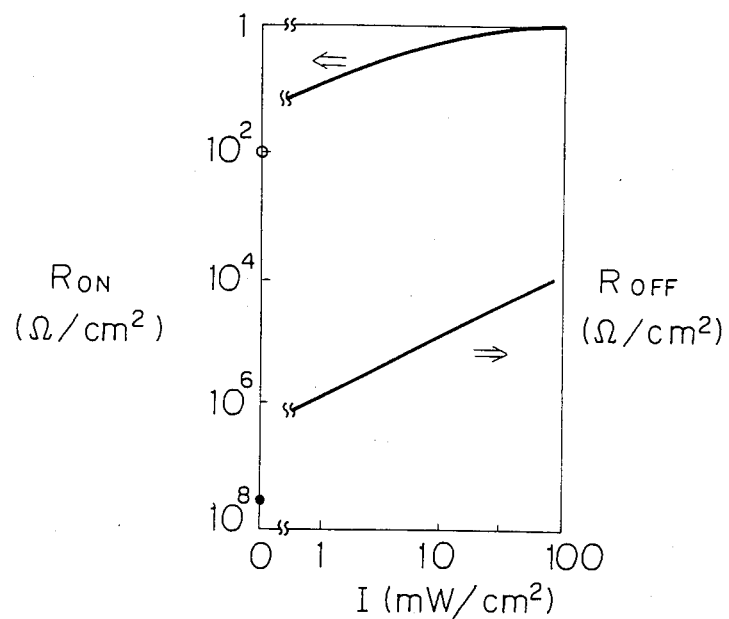
FIG. 15 is a graph illustrating the relationship between ON resistance Ron and OFF resistance Ron of a non-linear resistance element according to the present invention and incident light intensity.

With the present invention, it is also possible to positively utilize, rather than eliminate, the photo-electric effects of incident light. Since the rectifier elements are basically light-sensitive devices, it is difficult to completely eliminate the effects of incident light. With the present invention, one of the electrodes of a rectifier element, for example electrode 57 in FIG. 11, can be formed as a transparent electrode, from a material such as $Ir_2O_3:Sn$, or $SnO_2$, $ZnO$, etc. FIG. 15 shows the $R_{on}/R_{off}$ characteristics with respect to the level of incident light I. In the case of amorphous silicon diodes, for which attaining a sufficiently low value of $R_{on}$ is the major problem, the problem becomes less severe as the level of incident light increases. On the other hand, as the level of incident light increases, the value of $R_{off}$ decreases. However, the value of $R_{off}$ remains within permissible limits, so that this is not a serious problem. With an embodiment of the present invention, whereby a configuration employing the effects of incident light is used, the value of $R_{on}$ is decreased by a factor of 2 to 5 times, for a level of incident light of the order of 1,000 lux. Thus, the matrix resolution factor limit is increased by a factor of 2 to 5 times.

Figure 16:
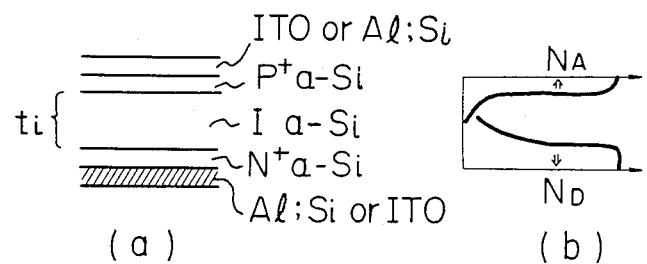
FIG. 16 illustrates the distribution of donor and acceptor carriers throughout a PIN diode structure.
Figure 17:
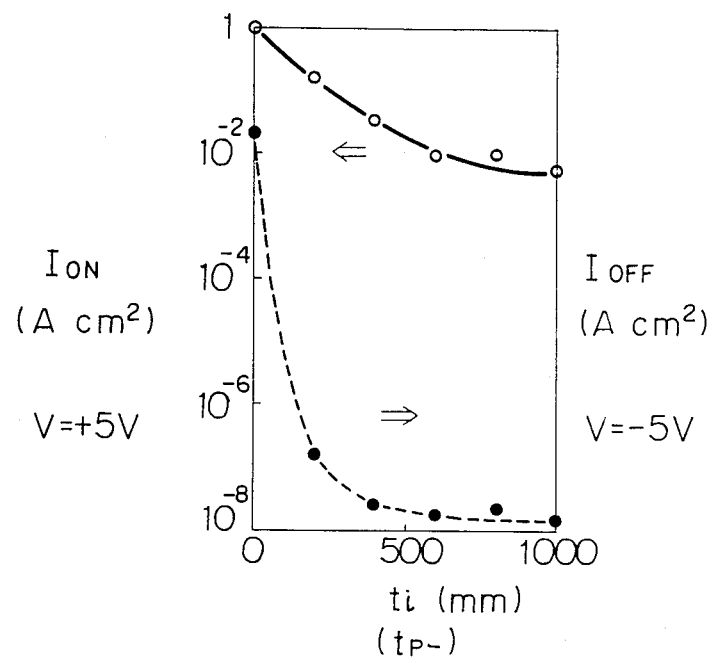
FIG. 17 is a graph illustrating the relationship between the ON current Ion and the OFF current Ioff and the thickness of an I-type semiconductor layer in a PIN diode structure.

FIG. 16 shows the relationship between the distribution of acceptor concentration $N_A$, and donor concentration Nd for a rectifier element having a configuration according to the embodiment of FIGS. 10 and 11. FIG. 17 shows the relationship between the thickness Ti of the I layer of the PIN semiconductor structure and $I_{on}$ and $I_{off}$. As Ti increases, $I_{off}$ rapidly decreases, and $I_{on}$ is increased. If amorphous silicon PN diodes are used in the display panel, then it is important to ensure that $I_{on}$ be sufficiently high, but with the substrate area occupied by the non-linear resistance elements minimized as far as possible. This will ensure that $I_{off}$ will be low, while the need for applying countermeasures in the element structure to cancel the effects of photo-electric current is considerably reduced. On the other hand, if the doping concentration in the I layer is made greater than the level actually necessary to withstand the maximum applied voltage, then the control characteristics will be improved and the element density can be increased. By comparison with a PN diode structure, a PIN diode structure will provide a reduced degree of stray manufacturing deviations in the values of $I_{on}$ and $V_{th}$, and a thickness of Ti greater than 3 nm can be used. In view of the above, a thickness Ti in the range 3 to 500 nm is optimum.

Figure 18:
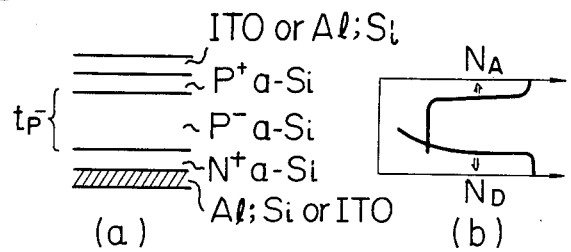
FIG. 18 illustrates the distribution of donor and acceptor carrier concentrations in a PIN diode structure in which the I-type layer is doped with boron.
Figure 19:
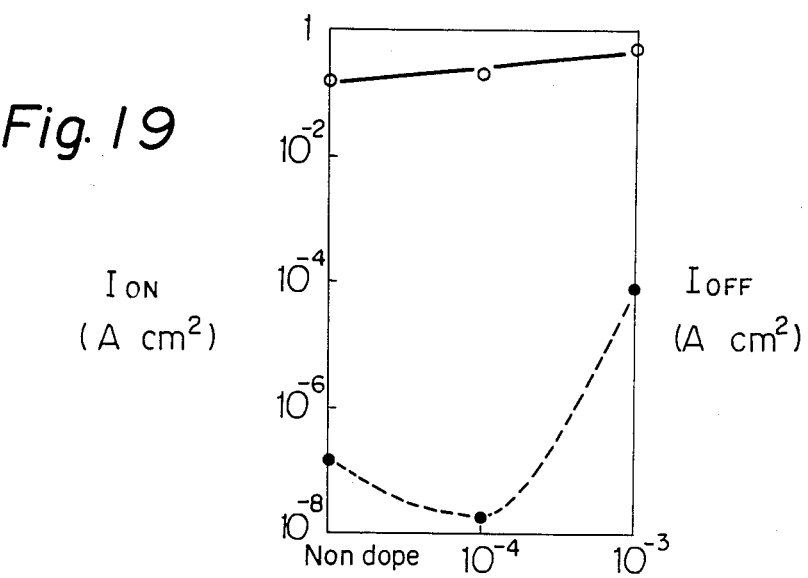
FIG. 19 is a graph showing the relationship between the mixture ratio of $B_2H_6/SiH_4$ in the I-type layer of a PIN diode and the resultant values of Ion and Ioff.

The limit on the level of forward current $I_{on}$ in a PIN configuration diode is mainly set by the hole current in the PI junction portion. If the I layer is slightly doped with boron then, as shown in FIG. 18, the P+PN structure thus provided will enable improvements to be made in the values of $I_{on}$ and $I_{off}$. FIG. 19 shows the relationships between the mixture ratio of $B_2H_6/SiH_4$ and $I_{on}$ and $I_{off}$. If the proportion of $B_2H_6$ is not excessively high, improvements in the characteristics can be obtained.

Figure 20:
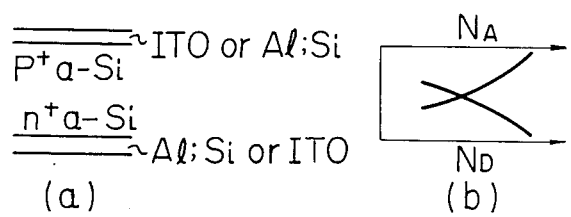
FIG. 20 illustrates the distribution of donor and acceptor carrier concentrations throughout a PN junction in which the junction is formed by gradual changes in the doping profile.

In addition, if the elements are formed from amorphous silicon using the plasma CVD method, photoassisted CVD method, or the sputtering method, then the doping profile (as measured along the direction of the thickness of the layers) can be freely controlled, and as shown in FIG. 20, the junctions can be formed by gradual changes in that profile. Such gradient junctions are extremely suitable for non-linear resistance elements to be used in a matrix display device. The reasons for this are as follows. Firstly, a high level of current can flow, due to the diffusion currents resulting from holes and electrons in the PI and IN junctions, so that $I_{on}$ can be made large. However, due to the presence of a low impurity concentration region formed as an intermediate region, the Fermi potentials of the doped layers on either side of the low doping concentration region can be accurately determined. As a result, stray deviations in the value of $V_{th}$ and junction leakage currents are greatly reduced.

Figure 21:
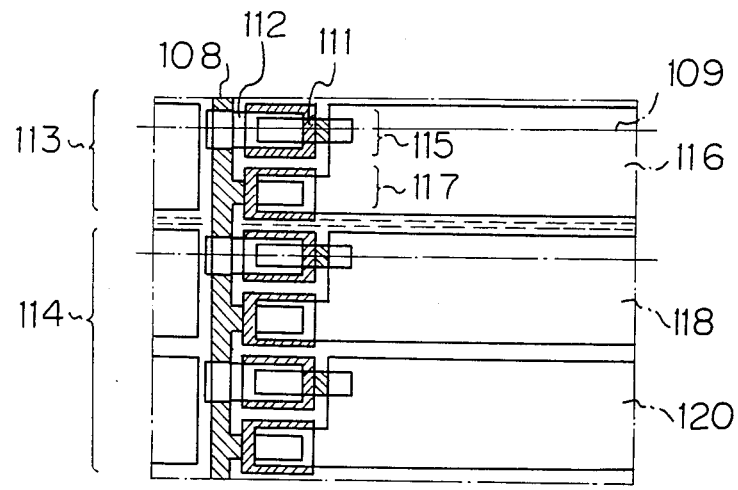
FIGS. 21 and 22 are a plan view and cross-sectional view respectively of a portion of a display panel according to an embodiment of the present invention in which a plurality of display elements with corresponding non-linear resistance elements are provided for each picture element.
Figure 22:
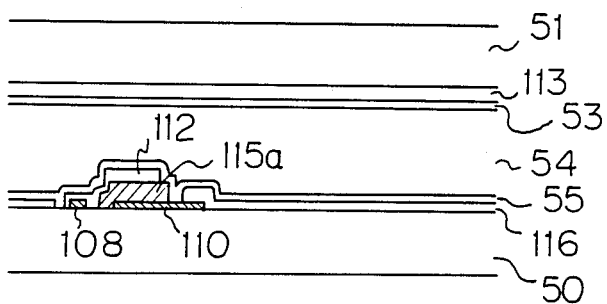

FIG. 21 shows a plan view of a portion of another embodiment of a display panel according to the present invention. In this embodiment, a plurality of display elements and non-linear resistance elements are provided for each picture element. FIG. 22 shows a cross-sectional view, taken along line 116 in FIG. 21. Numerals 108 denotes a column electrode which is coupled to one electrode of a rectifier element 115 and 117 by a conducting layer 112, which will be referred to as a first connecting electrode. Numerals 113 and 114 denote row electrodes, numeral 110 denotes a second connecting electrode, and 115a and 111 denote a semiconductor layer within which one or more diode junctions are formed. Numerals 51, 50 denote the substrates, 53, 55 denote a surface protection film and an alignment layer, respectively, numeral 116 denotes a display electrode and 54 a liquid crystal layer. Rectifier elements 115 and 117 each comprise a semiconductor layer and have electrodes coupled thereto on each side of the semiconductor layer. The two rectifier elements are connected in a ring configuration such as to constitute a bidirectional non-linear resistance element. Numerals 116, 118 and 120 respectively denote display electrodes.

Figure 23:
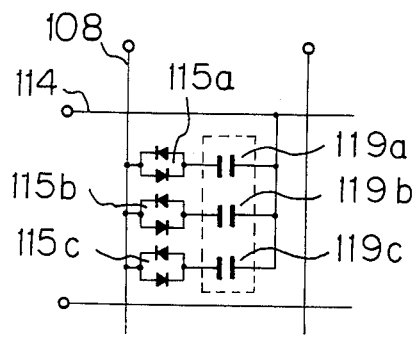
FIG. 23 is an equivalent circuit diagram of a picture element of the type shown in FIGS. 21 an 22.

The equivalent circuit diagram of a picture element for the embodiment of FIGS. 21 and 22 is given in FIG. 23 (with 3 display elements and 3 corresponding non-linear resistance elements being provided for each picture element). The display elements are 119a, 119b and 119c are connected in series with rectifier elements 115a, 115b and 115c respectively, at the intersection of a row electrode 114 and a column electrode 108, with this configuration constituting a picture element. This arrangement, whereby a plurality of groups of display elements and non-linear elements are provided for each picture element provides the following advantages. Firstly, it is not necessary to align the upper and lower substrates to a high degree of accuracy. This is because, if the position of a row electrode (or column electrode) on one substrate and the position of a display element coupled to a display electrode do not match, then crosstalk will occur in the case of a display device in which a single display element is provided for each picture element. However, with the embodiment of FIG. 23, a plurality of display elements are provided for each picture element, so that crosstalk is reduced and its effects can be made negligible. For these reasons the embodiment of FIG. 23, in which a number of display elements are provided for each picture element, provides increased image quality. In order to achieve the results described above, display electrodes 116, 118, 120 . . . shown in FIG. 21 should be positioned parallel to the row electrodes 113, 114 . . . .

A second advantage is that the manufacturing yield can be increased. That is to say, in the case of a display device in which one display element is provided for each picture element, then even if only one of the rectifier elements connected to a display element should become defective, then the entire picture element will become ineffective. Such an effect is extremely conspicuous, and reduces the image quality. However if a number of display elements are provided for each picture element, then even if one of the rectifier elements of a display element should become defective, there will be no effect upon the operation of the corresponding picture element, so that no defects will appear in the image.

Thus, as described above, a configuration according to this embodiment of the present invention is extremely advantageous with regard to improved manufacturing yield and image quality, and reduced overall manufacturing cost.

Figure 24:
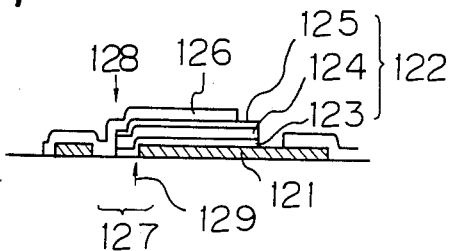
FIGS. 24, 25, 26, 27, 28 and 29 are cross-sectional views to illustrate other configurations for the rectifying elements shown in FIGS. 21 and 22.
Figure 25:
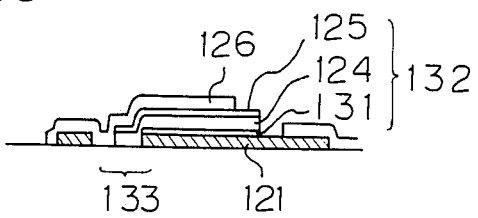
Figure 26:
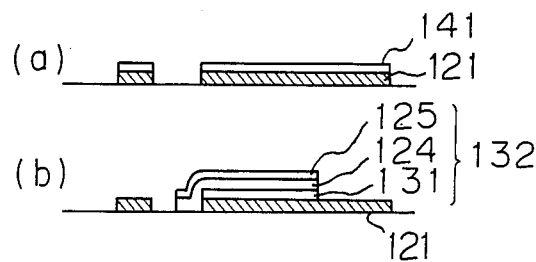

FIGS. 24, 25 and 26 show specific configurations for portions of the rectifier elements shown in FIGS. 22 and 21. In FIG. 24, numeral 121 denotes a lower electrode, numeral 122 a semiconductor portion, numeral 126 an upper electrode. The semiconductor portion 122 comprises a plurality of layers having differing types of doping impurity, or differing impurity concentrations. In FIG. 24, a PIN diode configuration is formed of three layers, namely a P (or N) type layer 123, a low impurity concentration layer 124, and an N-type (or P-type) layer 125. It is a disadvantage of this configuration that a side current path is formed between the P-type (or N-type) layer 123 electrode 126, outside the normal PIN current path. This problem of a side current path can be reduced by making the distance between terminal 129 of the lower electrode and output terminal 128 of the upper electrode large, and reducing the widths of the terminals. The advantage of the configuration of FIGS. 24 to 27 is that the entire structure comprises only three layers, i.e. the upper electrode layer, the semiconductor layer and the lower electrode layer, so that formation of these layers and the patterning processing stage can be carried out by a total of three steps. This will shorten the time required for manufacture, and will facilitate the manufacturing process, enabling a considerable reduction in cost.

FIG. 25 differs from the arrangement of FIG. 24 in the configuration of a portion 133 of the first of the semiconductor portions 132 to be formed, (i.e. the P-type or N-type layer 131.) More specifically, in the embodiment of FIG. 24, a part of semiconductor layer 123 is left on the upper electrode lead-out portion 127. In the embodiment of FIG. 25 on the other hand, that portion is eliminated. As a result, the disadvantage of the embodiment of FIG. 24, namely that a side current path is formed allowing leakage current flow, is considerably reduced. The manufacturing steps for the embodiment of FIG. 25 are illustrated in FIG. 26 (a) and 26(b). As shown, a self-alignment process is employed, to reduce the number of masking steps. Firstly, in step (a), the lower electrode layer 121 and semiconductor layer 141, having a first type of carrier (i.e. P-type or N-type) are succesively deposited. At the same time, using a single mask, patterning of these layers is carried out such that semiconductor layer 141 does not overlap electrode layer 121 onto the substruction. Next, the low impurity concentration layer 124 and semiconductor layer 125 having a second type of carrier (i.e. N-type or P-type) are deposited successively, with masking being carried out simultaneously. During this patterning step, semiconductor layer 141 is etched so as to be patterned into the form indicated by numeral 131. Through these processing steps, the semiconductor layer 131, which is of the first conduction type, becomes superimposed on the lower electrode pattern, without overlap, with the positions of these superimposed layers being automatically aligned, i.e. self-aligned.

Figure 27:
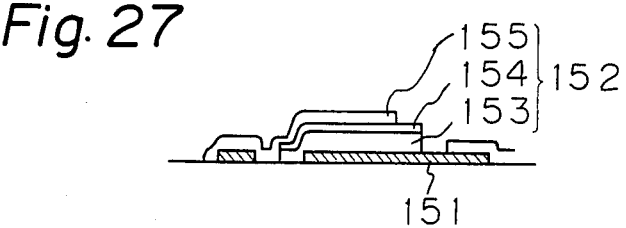

FIG. 27 is a cross-sectional view of another embodiment of the present invention, showing a portion of a rectifier element. Numeral 151 denotes a lower electrode, numeral 152 a semiconductor portion, numeral 155 an upper electrode. Lower electrode 151 and semiconductor portion 152 form a Schottky barrier type junction, while upper electrode 155 and semiconductor portion 152 form an ohmic junction. The lower element 151 can be formed for example by a film of platinum, using a sputtering process, and semiconductor portion 152 can be formed as an amorphous silicon film by plasma CVD formation, and the upper electrode 155 can be formed as a transparent conducting film of indium oxide. The lower portion 153 of semiconductor portion 152 comprises a layer of low impurity concentration semiconductor, in order to provide a Schottky junction, while the upper portion 154 of semiconductor portion 152 comprises a semiconductor layer which includes an impurity such as boron or phosphorus. Use of a Schottky barrier type of junction, as in this embodiment, provides the following advantages. Firstly, a high level of forward current flow can be attained. As can be understood from the drive signal waveforms shown in FIGS. 7 and 8, drive signals are applied to the non-linear resistance elements of a matrix display device in a time-sharing manner, and it is necessary to provide a sufficiently high level of current to the display elements. Thus it is necessary to provide a sufficiently high level of forward current flow in the elements. However, in the case of the previously described examples in which PIN diodes or PN diode junctions are utilized, the level of forward current flow is low, and as a result the area of each display element must be made large. However by utilizing Schottky barrier junctions, rather than current flow being based upon minority carrier drift currents as in the case of PIN junctions or PN junctions, forward current flow results from majority carriers, so that a sufficiently high degree of current flow can be attained.

A second advantage of using rectifier elements based on Schottky barrier junctions in a matrix display device is that charge accumulation is reduced, by comparison with the use of PN junctions or PIN junctions. Because of this, cross-talk is low. Since current flow in PIN and PN junctions is based upon minority carriers, when a changeover in the direction of applied voltage takes place from the forward direction to the reverse direction the accumulated minority carriers are not removed immediately from the junction region, so that forward current flow cannot be halted immediately upon application of a reverse bias voltage. This phenomenon results in cross-talk on the display, producing a lowering of display resolution. However if Schottky barrier junctions are used, as with the present embodiment, the degree of charge accumulation resulting from the minority carriers is negligible, so that cross-talk is reduced.

Due to the advantages described above, utilizing Schottky barrier junctions for the rectifier elements enables good response to be attained even when drive signal pulses of short duration are applied, so that a high-density display having for example 500 to 1000 or more scanning lines can be produced.

A third advantage of this embodiment is that manufacture is facilitated. If Schottky barrier junctions are utilized, the side current path leakage which occurs with the embodiment of FIG. 24 does not occur, so that the manufacturing steps illustrated in FIG. 26 are not necessary. More specifically, by forming a Schottky barrier at the junction between the lower electrode and the semiconductor layer in the configuration of FIG. 27, an element can be formed by three steps of film formation and patterning operations. The element thus formed will not display side current path leakage.

It is possible to use a metal other than platinum for the Schottky junctions, such as Ir, Au, Rh, Pd, Ni, Cr, Al, etc, while polycrystalline or microcrystalline silicon, or Te, Se, Cd, CdS, InP, GaAs, etc can be used for the semiconductor material, and Al, Cr or Ni, etc can be used to form ohmic junctions. It is also possible to invert the configuration shown in this embodiment, i.e. to form the Schottky junction between the lower electrode and the semiconductor portion, and to form an ohmic junction between the upper electrode and the semiconductor portion. It is also possible to form a MIS type of junction by inserting a thin insulating layer within the Schottky junction.

Figure 28:
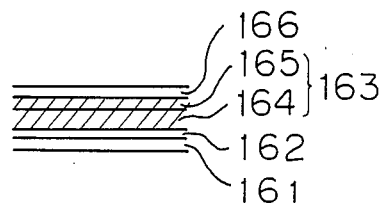

FIG. 28 is a cross-sectional view of an MIS type of rectifier element. Numeral 161 denotes a row electrode, numeral 162 a thin insulating film, numeral 163 a semiconductor portion, and numeral 165 an upper electrode. Since the semiconductor portion 163 displays an MIS characteristic, a low impurity concentration layer 164 is provided on the insulating film side of the structure, and a high impurity concentration layer 165 is formed on the upper electrode side of the semiconductor layer, to provide an ohmic contact. That is, the semiconductor layer 163 comprises two layers. Materials such as Pt, Cr, etc can be used for the lower electrode, while material such as $Ta_2O_5$ or $TiO_2$ can be used for the insulating film, while amorphous silicon can be used for the semiconductor portion and a material such as ITO (indium tin oxide) can be used for the upper electrode.

It is an advantage of using MIS type rectifier elements in a display device that a high value of threshold voltage Vth can be obtained. For example, if the lower electrode is formed of Cr, then if no insulating film is used, Vth will be of the order of 0.2 V. However, if an MIS configuration is used, with an insulating film formed of TiOx having a thickness of the order of 30 Å, then the value of Vth increases to the order of 0.55 V.

Figure 29:
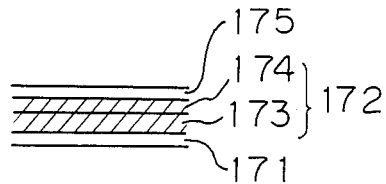

FIG. 29 is a cross-sectional view of a hetero-junction type of rectifier element. Numeral 171 denotes a row electrode, numeral 172 a semiconductor portion, 172 an upper electrode. In this embodiment, the lower electrode is formed of a conducting type of semiconductor, with a hetero-junction being formed between this electrode and the semiconductor portion. For example, if the lower electrode is formed of $In_2O_3$:Sn, the semiconductor portion is formed of amorphous silicon, and the lower electrode side of the semiconductor portion consists of a low impurity concentration layer 173, then a suitable junction can be formed. Numeral 174 denotes a high impurity concentration layer, for providing a non-rectifying contact with the upper electrode 175.

The advantages of using a hetero-junction type of rectifier element in a display device are as follows. Firstly, the manufacturing process is simple, and stable characteristics can be obtained. For example, if the manufacturing process illustrated in FIG. 15 is employed, then film formation and patterning operations can be carried out by a total of three steps.

Figure 30:
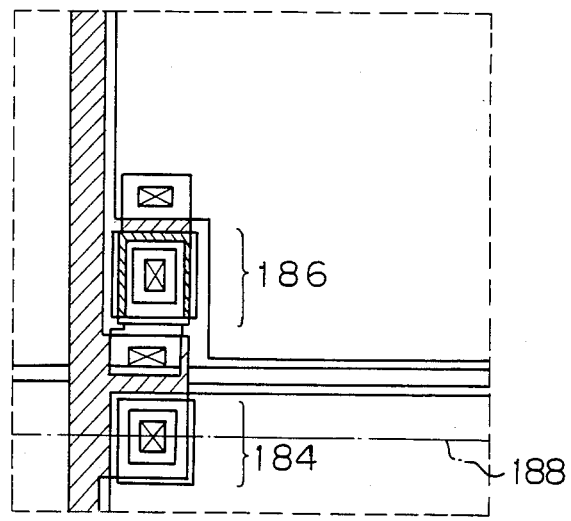
FIGS. 30 and 31 are a plan view and cross-sectional view respectively of a portion of a display panel according to another embodiment of the present invention.
Figure 31:
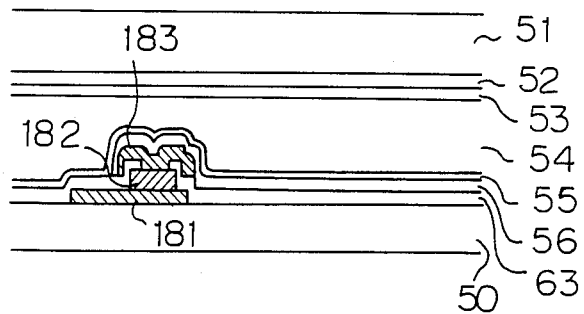

FIG. 30 is a plan view of a display panel portion of another embodiment of the present invention and FIG. 31 is a cross-sectional view taken through line 188. In this embodiment, a lower electrode 181 disposed beneath a semiconductor portion 182 and an upper electrode 183 are both formed as non-transparent conducting layers. With such a configuration, light cannot enter the semiconductor portion, so that no changes will result in the characteristics of the light-sensitive elements due to incident light. Furthermore, lead-out connection to the upper electrode is implemented through a contact hole provided in insulating film 63, so that the contact lead does not touch a side face of the semiconductor portion. Thus, the side current path leakage which occurs with the arrangement shown in FIG. 24 will not be produced.

In the embodiments of the present invention described above, each non-linear resistance element comprises a pair of rectifier elements, each comprising a single diode, connected in parallel with opposing polarities, to thereby form rectifier elements having a symmetrical bidirectional conduction characteristic of the basic shape shown in FIG. 3. Such an arrangement is suitable if a low but precisely controlled value of threshold voltage is sufficient. However in some cases it may be necesssary to provide a higher value of threshold voltage than is possible with a single diode stage. In such a case, a non-linear resistance element can be formed of a two sets of rectifier elements, each comprising a plurality of diode stages connected in series for unidirectional conduction. The equivalent circuit of such an arrangement is shown in FIG. 32, in which a non-linear resistance element 190 comprises a pair of sets of rectifier elements 192 and 194 each comprising a plurality of diode stages, sets 192 and 194 being connected in parallel with opposing polarities.

An alternative arrangement for providing a non-linear resistance element having a high value of threshold voltage is illustrated in the equivalent circuit of FIG. 34. Here, the non-linear resistance element can be thought of as comprising a plurality of diode rings 204, 206, . . . connected in series, each containing a pair of diodes connected in parallel with opposing polarities. This functions electrically in the same way as the arrangement of FIG. 32, but may enable the interconnections between the diode stages to be made simpler than for the case of the connection method of FIG. 32.

With the configurations of FIGS. 32 and 34, if a large number of diode stages are provided in each non-linear resistance element, then the non-linear resistance element will become defective if there are any open-circuits in the connecting leads between the diodes. Thus, such an arrangement may result in a relatively low manufacturing yield for the overall matrix display device, if this comprises a large number of non-linear resistance elements. In the embodiment of the present invention illustrated in the equivalent circuit of FIG. 32, a plurality of non-linear resistance elements, each comprising two sets of rectifier elements (e.g. as denoted by numerals 198 and 200) are coupled to each display element. Thus, a defective rectifier element or defective connecting lead between rectifier elements in one of the sets will only affect one of the non-linear resistance elements, and so will not affect the operation of the corresponding picture element. As a result, the overall manufacturing yield of a matrix display device using such an arrangement will be significantly enhanced.

Figure 35:
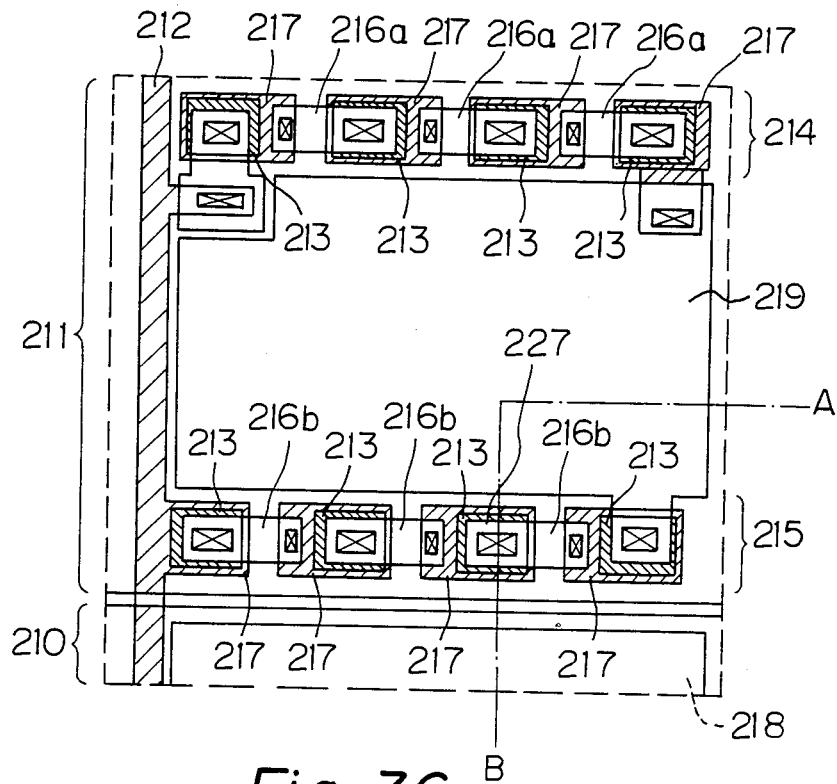
FIG. 35 is a plan view and FIG. 36 a cross-sectional view of a portion of a display panel in which each non-linear resistance element is formed of rectifying elements which are separately disposed on a substrate.
Figure 36:
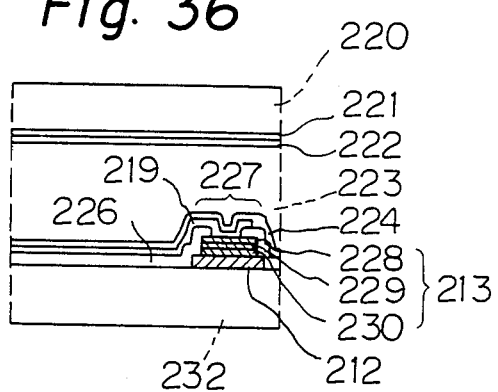

FIG. 35 shows a plan view of portion of a display panel according to an embodiment of the present invention, corresponding to the equivalent circuit of FIG. 32, in which diodes formed by thin-film deposition on a substrate are interconnected by connecting leads formed on that same substrate. FIG. 36 is a cross-sectional view of the display panel of FIG. 35, taken along lines A-B. Numerals 220 and 32 denote substrates, numerals 210 and 211 denote row electrodes, numerals 222 and 224 denote a surface protection layer and an alignment layer respectively, and numeral 223 denotes a display element such as a liquid crystal display element. Numerals 218 and 219 denote display electrodes for connecting to the display elements, e.g with display electrode 219 connecting to display element 223.

Numerals 214 and 215 denote two sets of rectifier elements, corresponding to sets 192 and 194 shown in FIG. 32. In this example, each rectifier element comprises a P-type semiconductor layer 30, an I-type semiconductor layer 229 having a low impurity concentration, and an N-type semiconductor layer 228, which are collectively designated as semiconductor portion 213. Numeral 226 denotes an electrically insulating layer. Each rectifier element 214 is a diode having the configuration shown in FIG. 36. Numeral 216b denotes connecting leads formed on substrate 232 to interconnect the rectifier elements of set 215, while numeral 216a denotes corresponding connecting leads formed on substrate 232 to interconnect the rectifier elements of set 214. One terminal of rectifier element set 215 is connected to column electrode 212, while the opposite terminal is connected to display electrode 219. Similarly, one terminal of rectifier element set 214 is connected to column electrode 212 with the opposite terminal connected to display electrode 219.

Such an arrangement has the disadvantage that the area on which the diodes are mounted is large, by comparison with the overall display area, so that the the aperture ratio and hence overall picture quality of the display will be low. In addition, a large number of connecting leads are required. As a result, a large number of contact holes are necessary, resulting in a high rate of contact defects.

Other embodiments of the present invention will now be described in which each set of series-connected rectifier elements is formed as a plurality of semiconducting and conducting layers stacked in a vertically overlapping manner on a substrate, such as to form alternating rectifying junctions and non-rectifying junctions, whereby the area which is required to mount the rectifier elements can be made small by comparison with the overall display area, the aperture ratio can be made high, and the picture quality is improved. In addition, the number of contact holes is reduced and the number of connecting leads is also reduced, so that a larger number of elements can be provided on a given surface area. Moreover, more uniform display quality can be obtained. These rectifier elements can be formed as continuous thin films, with all of the elements being formed together by an etching process. This enables a much higher productivity to be attained than for the case in which individual elements are connected in series upon a plane surface.

Figure 37:
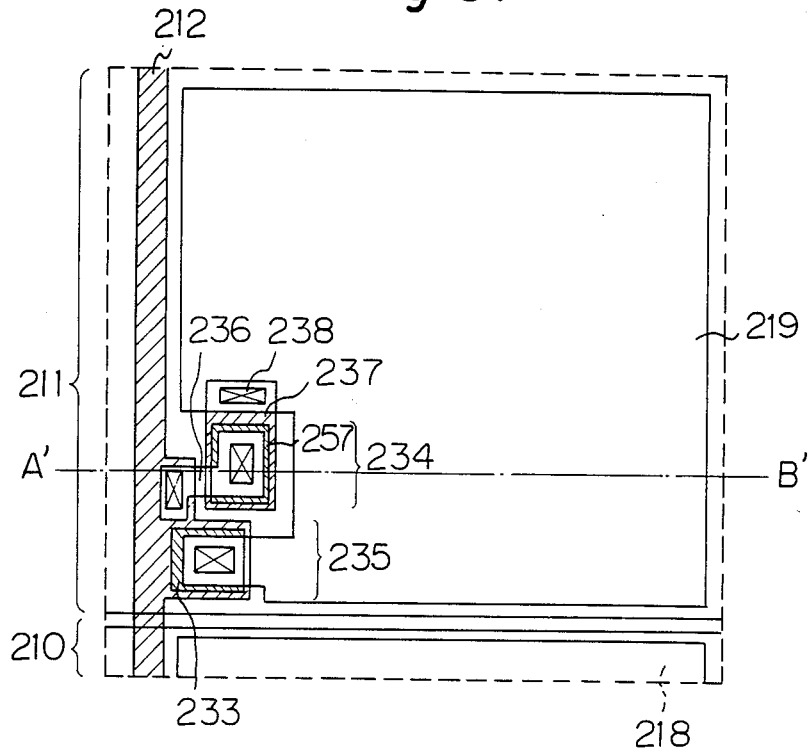
FIGS. 37 and 38 are a plan view and cross-sectional view respectively of a portion of a display panel according to an embodiment of the present invention, in which each non-linear resistance element comprises sets of rectifying elements formed with a multi-layer configuration.
Figure 38:
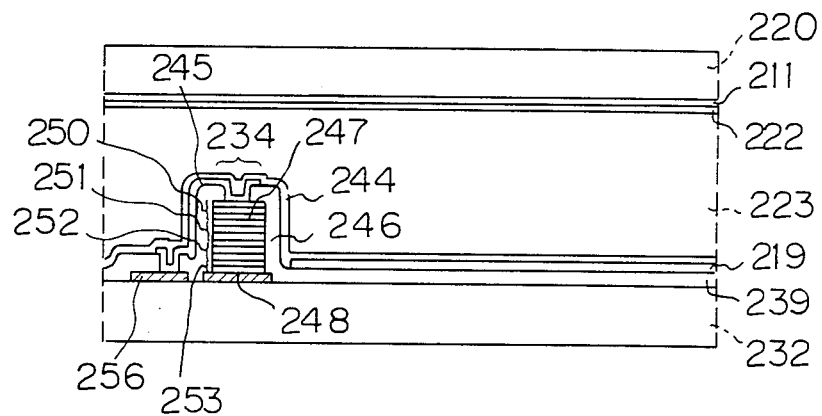

FIG. 37 shows a plan view of a portion of a display panel according to such an embodiment of the present invention. FIG. 38 is a cross-sectional view taken through line A'-B' in FIG. 37. By comparison with FIG. 35, in which a plurality of diodes are separately formed on a plane surface, this embodiment is characterized in that each non-linear resistance element is formed of two sets of rectifier elements, each set comprising a plurality of rectifier elements which are stacked on one another in a multi-layer configuration, so that the proportion of surface area occupied by the rectifer elements is significantly reduced. In FIGS. 37 and 38 numerals 220 and 232 denote substrates, numerals 210 and 211 denote row electrodes, numerals 222 and 244 denote a surface protective layer and an alignment layer respectively, and numeral 223 denotes a display element such as a liquid crystal display element. Numeral 212 denotes a column electrode. Numerals 238 and 239 denote display electrodes for connecting non-linear resistance elements to display elements, e.g. display electrode 239 connects to display element 223. Numerals 234 and 235 denote two sets of series-connected rectifier elements which in combination constitute a non-linear resistance element. Numerals 250 to 253 denote the rectifier elements which constitute set 234. These are formed with a multi-layer configuration, which can be for example a multi-layer Schottky diode configuration, a multi-layer combination of metal-insulator-metal (MIS) diodes, NP junctions formed by combinations of different types of doping impurities or different impurity concentrations formed in a semiconductor, PN junctions formed by differences in impurity concentration, or a multi-layer configuration of PIN junctions.

One terminal of the set of rectifier elements 234 is connected through a conducting layer 245 to column electrode 212 while the opposite terminal of rectifier element set 234 is connected by an electrode portion 248 through a connecting hole 238 formed in an insulating layer 239 to display electrode 219. Similarly, one terminal of the set of rectifier elements 235 (i.e. the terminal adjacent to substrate 232) is connected to column electrode 212 by an extension of the conducting layer constituting column electrode 212, while the opposite terminal of rectifier element group 235 is connected to the display electrode 219 by a conducting layer which is disposed in a similar manner to conducting layer 245 shown in FIG. 38. Since the rectifier elements in each of sets 234 and 235 are formed at the same time by the same steps of thin film deposition and patterning, it will be apparent that the equivalent circuit of the non-linear resistance element formed by rectifier element sets 234 and 235 and the connections between these and column electrode 212 and display electrode 219 will be as shown in FIG. 32. It will be clear from the above that a smaller area is occupied by each rectifier element, with this embodiment, than is required in the case of a plurality of diodes being connected in series along a surface. As a result, a larger aperture ratio can be obtained. In addition, since the number of contact holes and connecting leads is smaller, the manufacturing yield is excellent. Furthermore, since the current paths of the rectifier elements are disposed directly on the substrate, the ON current $I_{on}$ can be made large. Thus this embodiment is extremely effective for providing a display device which has a high degree of resolution and a high aperture ratio, together with ease of manufacture.

Figure 39:
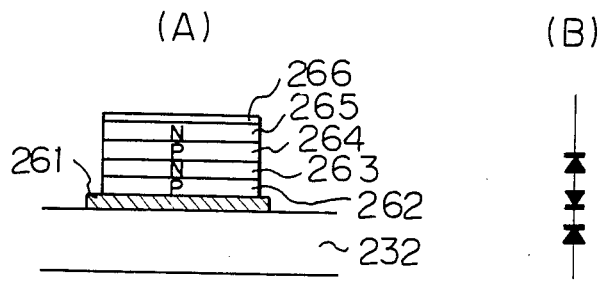
FIG. 39 is a diagram showing a generally-used type of multi-layer configuration.
Figure 40:
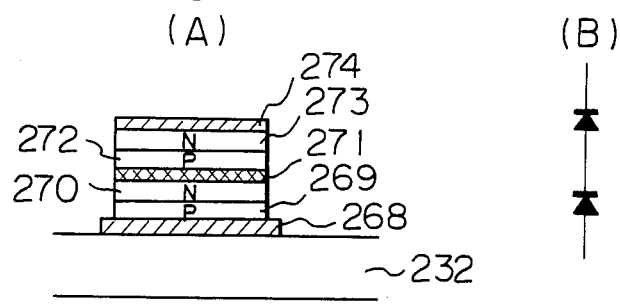
FIG. 40 is a diagram showing a metallic layer formed in a non-rectifying junction portion in a multi-layer rectifying element configuration.

With a display device according to the above embodiments, the non-linear resistance elements are formed of sets of rectifier elements which are successively stacked on one another with the same direction of polarity. As described hereinabove, it is preferable to utilize devices such as PN or PIN diodes, Schottky junction diodes or MIS junction diodes to form the non-linear resistance elements, since these provide greatly superior control of the element characteristics and threshold voltage than is possible with devices such as varistors or MIM elements. Use of such preferred devices to form sets of rectifier elements having a multi-layer configuration of the form shown in FIG. 38 will now be described, with reference to the following embodiments. Before describing preferred embodiments, an unsuitable arrangement will be discussed, referring to FIG. 39(A) Here, it is assumed that rectifier elements comprising PN diodes are utilized. These are simply stacked vertically on a substrate. FIG. 39(B) shows the equivalent circuit of FIG. 39(A). In FIG. 39(A), numeral 232 denotes a substrate (formed of a material such as glass or ceramic), numeral 261 denotes an electrode formed of Al or Cr. Numerals 263, 264 denote a P-type semiconductor layer (P), numerals 263, 265 denote an N-type semiconductor layer (N) and 266 denotes an electrode. As can be seen from the diagram, this arrangement siimply consists of layers of diodes, so that a reverse-biased junctions is formed for either polarity of applied voltage. With the present invention, however, the rectifier elements are alternately stacked on the substrate, with rectifying junctions alternating with nonrectifying junctions. As a result, reverse-biased junctions are eliminated, so that $I_{on}$ can be large and $V_{th}$ can also be large. An example of this will now be described, referring to FIG. 40.

Here, a multi-layer configuration of PN diodes are formed by P-type semiconductor layers (P) 269, 272 and N-type semiconductor layers (N) 270, 273. The rectifying junctions are denote by numerals 269 to 270 and 270 to 273. A non-rectifying junction is formed by a conducting layer 271 formed between layers 270 and 272, which effectively short-circuits the reverse-biased PN junction which would otherwise be formed between layers 270 and 272. This conducting layer 271 can be formed of a metal such as Ar or Cr. In FIG. 40(A), numeral 232 denotes the substrate (formed of a material such as glass or ceramic), numerals 268, 274 denote electrodes (formed of a material such as Ar or Cr). FIG. 40(B) shows the equivalent circuit diagram for the arrangement of FIG. 40(A). By using a configuration for the rectifier elements whereby non-rectifying junction and rectifying junction are alternately and successively stacked on one another, formation of reverse-biased junctions is prevented, and $I_{on}$ can be made large.

Figure 41:
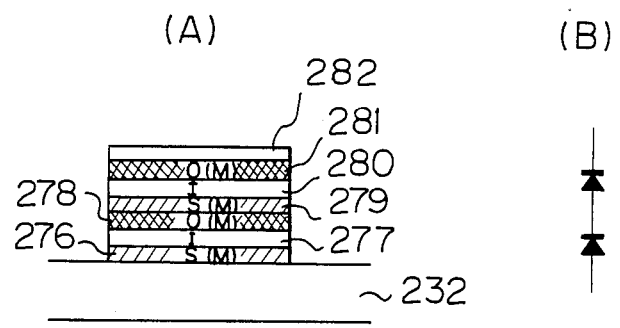
FIG. 41 is a diagram showing a metallic layer formed in a non-rectifying junction portion in a multi-layer rectifying element configuration employing Schottky junctions.

Some embodiments of the present invention will now be described which utilize Schottky junctions, PN junctions, PIN junctions, and MIS junctions. In the case of Schottky junctions being used to form the rectifier elements, a Schottky junction diode configuration comprising semiconductor layers and metallic layers is employed. The metallic layers can be further utilized as connecting leads, to thereby reduce the number of manufacturing steps required. In addition, the semiconductor layers can be made thin, and since this enable a high value of $I_{on}$ to be attained, use of Schottky junctions is advantageous. FIG. 41 shows an embodiment of the present invention in which Schottky junctions are used to form the rectifying junctions of the rectifier elements. In FIG. 41, numeral 232 denotes a substrate (formed of a material such as glass or ceramic). numerals 277 and 280 denote a semiconductor layer (I) formed of a material such as Si or Ge, numerals 276 and 279 denote conducting layers S(M) used to form Schottky junctions with the semiconductor layers, these conducting layers being formed of a material such as S(M) or a thin film of Cr, Pt or ITO, or $SnO_2$. Numerals 278 and 281 denote metallic layers formed of a material such as Al or Au, which serve to short-circuit layers 277 and 279, and to form an ohmic junction with electrode 282, respectively.

Figure 42:
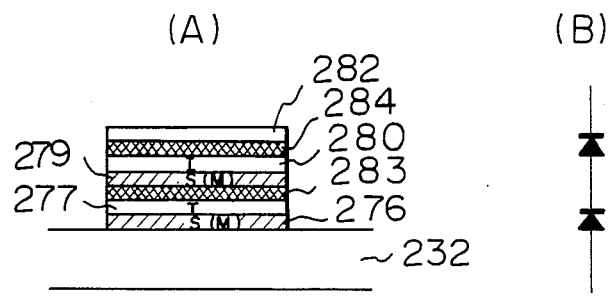
FIG. 42 is a diagram showing a high impurity concentration layer formed in a non-rectifying junction portion in a multi-layer rectifying element configuration employing Schottky junctions.

FIG. 42 shows a embodiment in which, instead of the metallic layers 278 and 281 in the embodiment of FIG. 41, semiconductor layers 283 and 284 having a high impurity concentration are uitlized to shortcircuit the I and S(M) layers 277 ad 279, and to form an ohmic junction with electrode 282, respectively. The layer of high impurity concentration semiconductor material can be formed by mixing impurities from a suitable source with the semiconductor at the time of formation of the semiconductor thin film, or by means such as In implantation, etc. It should be noted that the use of such a high impurity concentration semiconductor layer enables better ohmic contact to be attained with the adjacent semiconductor layers than is possible when metallic layers are used for this purpose (i.e. as in the embodiment of FIG. 41).

Figure 43:
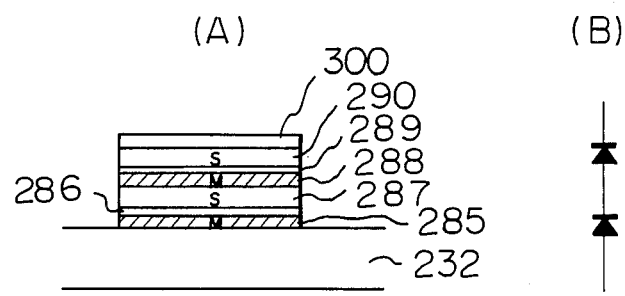
FIG. 43 is a diagram showing a multi-layer configuration for the case of MIS elements being employed in a non-linear resistance element.

FIG. 43 shows an embodiment of the present invention in which MIS junctions are used as the rectifying junctions of the rectifier elements. Because an MIS configuraion is utilized, a metallic layer can be used as an electrode. In addition, by suitably selecting the metal employed (e.g. as Al, or Au) to provide ohmic contact with the semiconductor layer, level of $I_{on}$ can be kept high and the value of threshold voltage $V_{th}$ make high, simply by using a stacked MIS diode configuration. Furthermore, by doping the semiconductor layers with suitable impurities, $I_{on}$ can be enhanced. In FIG. 43, numerals 285 and 288 denote metallic layers (e.g. formed of Al, Au, Cr), numerals 286 and 289 denote insulating layers (e.g. formed of $SiO_2$, $Si_3N_4$, or $Al_2O_3$) while numeral 290 denotes a semiconductor layer (e.g. formed of Si or Ge). Numeral 300 denotes an electrode (e.g. formed of Al or Au) which forms an ohmic contact with layer 290. It is possible to form a semiconductor layer having a high impurity concentration between layers 287 and 288, and between layers 290 and 300, it or to use various other metals.

If the rectifier elements are formed of PN diode junctions, then stable characteristics can be obtained for the PN junctions formed between the P-type semiconductor layers and N-type semiconductor layers by suitably controlling the types of impurity and the impurity concentration in the semiconductor. By using PN junctions as rectifying junctions in the rectifier elements according to the present invention, a display device can be provided which has uniformity of picture quality and good control of the element characteristics.

Figure 44:
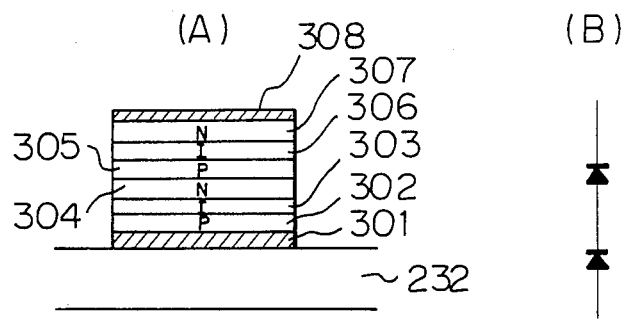
FIG. 44 is a diagram showing a multi-layer configuration for the case of PIN junctions being employed in a non-linear resistance element.

It should be noted that if semiconductor thin films formed at low temperature, or extremely thin semiconductor films are used as the semiconductor layers, then breakdown of the PN junctions can occur, Roff may be excessively low, and the elements may not provide a sufficiently high ON/OFF ratio. These problems can be overcome by providing an I-type semiconductor layer between each P-type semiconductor layer and N-type semiconductor layer, this I-type semiconductor layer having a low impurity concentration to thereby provide PIN junctions. FIG. 44 shows an embodiment of the present invention in which PIN junctions are utilized. Numerals 302 and 305 denote P-type semiconductor layers, 304 and 307 denote N-type semiconductor layers, and numerals 303 and 306 denote I-type semiconductor layers, i.e. layers having a low impurity doping concentration. In FIG. 44, the rectifying junctions comprise PIN junctions formed between layers 302 to 304 and 305 to 307 respectively. A reverse-biased junction is formed between layers 304 to 305, however since breakdown of this junction will occur and a current thereby flow through it, this will actually function as a non-rectifying junction.

Amorphous silicon can be effectively utilized as the material for these semiconductor thin films, with a multi-layer configuration being formed by successive layers having alternately high and low impurity concentrations, or alternately different types of impurity doping in successive layers. These layers can all be formed within a single chamber, and etching can be carried out at the same time. In this way, the number of steps of the manufacturing process can be significantly reduced. In order to provide good control of element characteristics and to obtain a high value of $I_{on}$, if amorphous silicon is used, conducting layers formed of a metal (e.g. Al, Cr) can be provided between the NP junctions 304 and 305. However by providing a semiconductor layer which is doped with metal molecules between layers 304 and 305, formation of reverse-biased junctions can be more effectively suppressed, to provide non-rectifying junctions, and $I_{on}$ can be thereby increased. Furthermore, the semiconductor layers can be produced as a continuously formed thin film, by adding a material such as metal vapor to the thin film while it is being formed, to thereby produce suitably doped layers. In addition, etching patterning of the rectifier elements can be performed simultaneously with deposition of the layers constituting the rectifier elements. This will not only reduce the number of manufacturing steps, but will also enable rectifier elements having a high value of threshold voltage $V_{th}$ and $I_{on}$ to be produced. The forward current ($I_{on}$) which flows in a PIN junction is limited by the fact that it consists mainly of a flow of hole carriers through the PI junction. Thus, by adding a small amount of boron to the I layer, the $I_{on}$ current can be increased.

It is necessary to provide uniformity of the characteristics of diodes used in a display device, and it is also necessary to be able to control the qualities of semiconductor thin films, e.g. the impurity concentrations, the degree of surface irregularity, pinholes, and thickness distribution. Methods of forming semiconductor thin films include the plasma CVD method (chemical vapor phase deposition), the photo-assisted CVD method, sputtering methods, etc. Since these methods enable thin films to be formed at low temperatures, the diodes can be formed upon glass, ceramic, or high-polymer film, enabling large sizes of display devices to be produced at low cost.

From the above description, it will be clear that the present invention enables a matrix display device to be produced in which the application of drive signal potentials to each display element is controlled by one or more two-terminal non-linear resistance elements having a symmetrically bidirectional voltage-current characteristic to enable driving of elements such as liquid crystal display elements which require an alternating drive signal, and that these non-linear resistance elements are formed by thin-film deposition upon a substrate of the display device. Each non-linear resistance element comprises two sets of rectifier elements connected in parallel with mutually opposing polarities, each set comprising one or more rectifier elements connected in series. If the drive method adopted and the type of display element are such that only a low value of threshold voltage is necessary, then each set of rectifier elements can comprise a single diode junction. However if a number of rectifier elements mustbe provided in each set, to thereby form a non-linear resistance element having a high value of threshold voltage, then the present invention describes the formation of sets of vertically stacked rectifier elements formed with a multi-layer structure whereby the substrate area required by each non-linear resistance element is minimized, to thereby enhance the display picture quality. Such an arrangement further serves to increase the reliability of interconnections between the rectifier elements, thereby increasing reliability and overall manufacturing yield of the matrix display device.

Although the present invention has been described in the above with respect to specific embodiments, it should be noted that various changes and modifications to these embodiments may be envisaged which fall within the scope claimed for the present invention. The above specification should therefore be interpreted in an illustrative and not in a limiting sense.

What is claimed is:

1. A matrix display device comprising:
   a plurality of row electrodes and column electrodes;
   a plurality of display elements;
   a plurality of non-linear resistance elements;
   connecting electrode means for coupling said non-linear resistance elements and display elements, and;
   drive signal generating means for applying drive signals to said row electrodes and column electrodes;
   each of said non-linear resistance elements comprising at least one pair of sets of rectifier elements formed by a thin film deposition process on a substrate of said matrix display device, each of said rectifier elements comprising a semiconductor portion having a multi-layer configuration comprising at least a first semiconductor layer doped with a predetermined impurity concentration level and a second semiconductor layer having a substantially lower impurity concentration level than said first semiconductor layer and disposed overlapping said first semiconductor layer, said semiconductor layers of the thin film rectifier elements comprising amorphous silicon, with one rectifier element set of each of said pairs being connected in parallel with the other set of said pair, said sets in each pair being connected with mutually opposing polarities, and each of said display elements being connected in series with at least one of said non-linear resistance elements between one of said row and column electrodes;
   the rectifier element sets of each of said pairs thereof being formed on said substrate with an electrically symmetrical configuration, such that electrical currents respectively generated in said pair of rectifier element sets due to the effects of light or heat will mutually cancel.

2. A matrix display device according to claim 1, in which said connecting electrode means comprise a plurality of transparent electrodes, with at least a part of one surface of each of said sets of rectifier elements being covered by one of said transparent electrodes, the configuration being such that externally produced light passes through said transparent electrodes to be incident upon said thin film rectifier elements.

3. A matrix display device according to claim 1, in which each of said semiconductor portions of said thin-film rectifier elements comprises a layer of P-type semiconductor, a layer of N-type semiconductor, and a layer of I (intrinsic)-type semiconductor having a very low impurity concentration, disposed between said P-type and N-type semiconductor layers.

4. A matrix display device according to claim 3, in which said I-type semiconductor layer has a thickness which is in the range 3 to 500 nanometers.

5. A matrix display device according to claim 1, each of said semiconductor portions of said thin-film rectifier elements comprises a first layer of P-type semiconductor, a layer of N-type semiconductor, and a second layer of P-type semiconductor which has an impurity concentration substantially lower than that of said first P-type semiconductor layer.

6. A matrix display device according to claim 1 in which said connecting electrode means comprise opaque portions thereof, and in which said opaque portions are disposed such as to block external light from impinging upon said rectifier elements.

7. A matrix display device according to claim 1, in which each of said thin-film rectifier elements comprises an electrically conducting upper electrode layer, a first semiconductor layer having a predetermined impurity concentration, and disposed immediately below said upper electrode layer, a second semiconductor layer having a substantially lower impurity concentration than said first semiconductor layer and disposed immediately below said first semiconductor layer, and a lower electrode layer formed of a metallic material disposed immediately below said second semiconductor layer, with the material of said second semiconductor layer and the material of said lower electrode layer being selected such that a Schottky junction is formed between said second semiconductor layer and said lower electrode layer.

8. A matrix display device according to claim 7, in which said upper electrode layer comprises a transparent film of indium oxide.

9. A matrix display device according to claim 7, in which said first semiconductor layer contains an impurity selected from a group of materials including boron or phosphorus.

10. A matrix display device according to claim 7, in which said lower electrode layer is formed of a material selected from a group of metals including Pt, Ir, Au, Rh, Pd, Ni, Cr and Al.

11. A matrix display device according to claim 1, in which each of said thin-film rectifier elements comprises an electrically conducting upper electrode layer, a first semiconductor layer having a predetermined impurity concentration, and disposed immediately below said upper electrode layer, a second semiconductor layer having a substantially lower impurity concentration than said first semiconductor layer and disposed immediately below said first semiconductor layer, a layer of electrically insulating material disposed immediately below said second semiconductor layer, said electrically insulating material being substantially lower in thickness than either of said first and second semiconductor layers and a lower electrode layer formed of a metallic material disposed immediately below said electrically insulating layer.

12. A matrix display device according to claim 11, in which said lower electrode layer is formed of a material selected from a group of materials including Pt and Cr, in which said electrically insulating layer is formed of a material selected from a group of materials including $Ta_2O_5$ and $TiO_2$, and in which said upper electrode layer is formed of ITO (indium tin oxide).

13. A matrix display device according to claim 1, in which each of said thin-film rectifier elements comprises an electrically conducting upper electrode layer, a first semiconductor layer having a predetermined impurity concentration, and disposed immediately below said upper electrode layer, a second semiconductor layer having a substantially lower impurity concentration than said first semiconductor layer and disposed immediately below said first semiconductor layer, and a lower electrode layer comprising a semiconductor material having a high level of electrical conductivity, disposed immediately below said second semiconductor layer.

14. A matrix display device according to claim 1, in which each of said sets of rectifier elements comprises a plurality of rectifier elements, formed as a plurality of successively superimposed layers.

15. A matrix display device according to claim 14, in which each of said sets of rectifier elements comprises a plurality of alternating layers of rectifying junctions and non-rectifying junctions which are formed successively over said substrate in a vertically stacked configuration.

16. A matrix display device according to claim 15 in which said rectifying junctions comprise Schottky junctions.

17. A matrix display device according to claim 15, in which said rectifying junctions comprise MIS type junctions, each comprising an electrically insulating layer disposed between a metallic layer and a semiconductor layer.

18. A matrix display device according to claim 15, in which at least a part of said non-rectifying junction portions comprise a semiconductor thin film which is doped with a metal.

19. A matrix display device according to claim 16, in which the rectifying junctions of said rectifier elements comprising Schottky junctions are each formed of a first metallic layer and a semiconductor layer, and in which said non-rectifying junctions comprise a layer of semiconductor and a second metallic layer.

20. A matrix display device according to claim 16, in which the rectifying junctions of said rectifier elements comprising Schottky junctions are each formed of a metallic layer and a semiconductor layer, and in which said non-rectifying junctions of said sets of rectifier elements are each formed of a first semiconductor layer having a low impurity concentration and a second semiconductor layer having a substantially higher impurity concentration than that of said first semiconductor layer.

21. A matrix display device according to claim 15, in which the rectifying junctions of said rectifier elements comprise PIN junctions each formed of a layer of low impurity concentration I-type semiconductor disposed between a layer of P-type semiconductor and an N-type semiconductor layer, and in which each of said non-rectifying junctions comprises a metallic layer, a P-type semiconductor layer and an N-type semiconductor layer.

22. A matrix display device according to claim 15, in which the rectifying junctions of said rectifier elements comprise MIS junctions each formed of an electrically insulating layer disposed between a metallic layer and a semiconductor layer, and in which the non-rectifying junctions of said sets of rectifier elements each comprise a metallic layer and a semiconductor layer, each of said sets of rectifier elements being formed of successively stacked MIS junctions.

* * * * *